Figure 1:
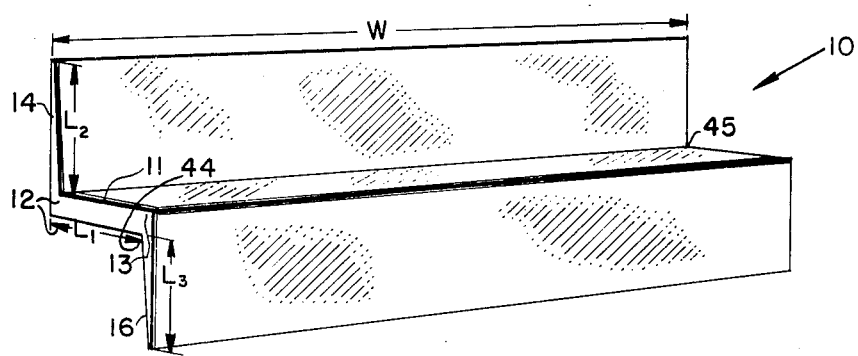

Aug. 10, 1965   H. W. DAVIES ETAL   3,200,191
CABLE SPLICE INSULATOR AND CABLE JOINT MADE THEREWITH
Filed May 10, 1962                                    2 Sheets-Sheet 1

INVENTORS
HOWARD W. DAVIES
BY OLAV E. JORE

THEIR AGENT

Aug. 10, 1965

H. W. DAVIES ETAL 3,200,191

CABLE SPLICE INSULATOR AND CABLE JOINT MADE THEREWITH

Filed May 10, 1962

2 Sheets-Sheet 2

INVENTORS
HOWARD W. DAVIES
OLAV E. JORE
BY  *v. F. Jock*

THEIR AGENT

United States Patent Office 3,200,191
Patented Aug. 10, 1965

3,200,191
CABLE SPLICE INSULATOR AND CABLE JOINT MADE THEREWITH
Howard W. Davies, Pittsburgh, Pa., and Olav E. Jore, Marion, Ind., assignors, by mesne assignments, to Anaconda Wire and Cable Company, a corporation of Delaware
Filed May 10, 1962, Ser. No. 193,752
8 Claims. (Cl. 174—88)

Our invention relates to electrical cable joints and particularly to joints in flexible cables such as mining machine cables, to insulators for use in such joints and to methods for making them.

In the widespread and growing mechanization of mining operations use is made of electrically powered machines connected by means of flexible cables to power sources that are remote from the point of operation of the machines. The extreme flexibility of the cables is dictated by the requirement that they must be repeatedly wound and rewound on reels and that they be laid in tortuous paths in order to avoid obstructing mine passages where space is at a premium.

In spite of the fact that such cables are built as ruggedly as possible breakages are of frequent occurrence due to the severity of service and the frequency with which the cables are run over by machines, and buried by falling stone, coal or the like. But the failure of a mining machine has the serious consequence of interrupting the operation of an expensive mining equipment and wasting the time of a crew of men who are dependent on the equipment. It is essential, therefore, that such failures should be repaired as expeditiously as possible even though it is difficult or impossible to maintain conventional cable repair facilities near the operating areas of a mine.

Not only is it essential to economical operation that cable repairs should be made promptly, it is also essential that the joints should be reliable and retain their flexibility so that the cables can be wound on their customary reels after splicing. It is also necessary that the size of the cable should not be increased in a manner that will prevent its passage through guides and grommets and that the shape of the cable be retained to facilitate reeling.

To meet these needs we have invented a flexible cable-splice insulator comprising a strip of insulating material and two transverse insulating webs extending in opposite directions from the edges of the strip. The webs are substantially less thick than the strip and will preferably be longer than the strip and may taper in section away from it. When used for cables with more than two electrical conducting elements our insulator may have one web longer than the other with a third web branching from the longer one in the direction of and parallel to the strip, or there may be a third and fourth insulating web branching in opposite directions from the first two webs.

We have invented a flexible cable joint in a cable having a plurality of conductors comprising a plurality of splices connecting the conductors, a strip of insulating material separating two of the splices, and two transverse insulating webs extending in opposite directions from the edges of the strip. The webs are substantially less thick than the strip and a helical tape wrapping covers the splice, folding the webs around the conductors. The strip may advantageously extend so that the webs fold around the cable jacket.

We have invented a method of jointing a jacketed cable having a plurality of insulated conductors comprising the steps of stripping the insulation and jacket to bare the conductors with the cable split between the conductors beyond the stripped portion, then inserting the strip between the splices so that it extends beyond the stripped portion of the conductors and helically wrapping a tape around the splices and jacket to fold the web around them.

A more thorough understanding of our invention may be gained from a study of the appended drawing.

Figure 2:
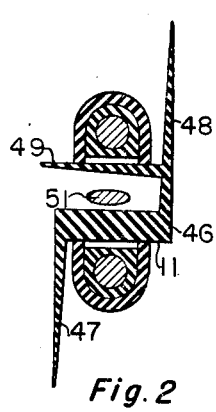
Figure 3:
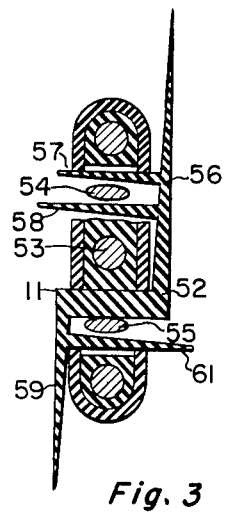
Figure 4:
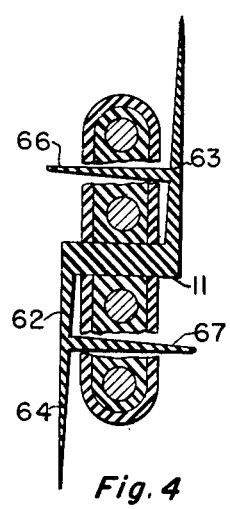
Figure 5:
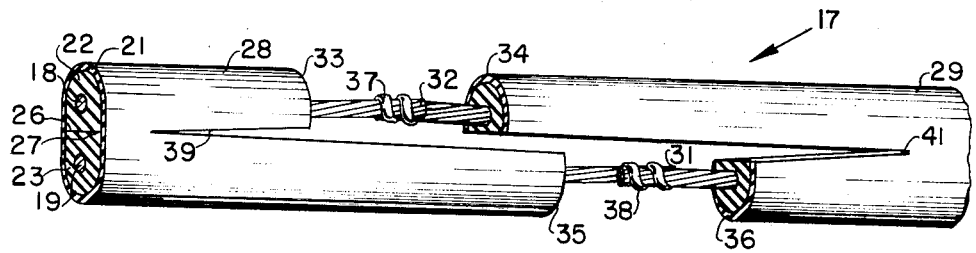
Figure 6:
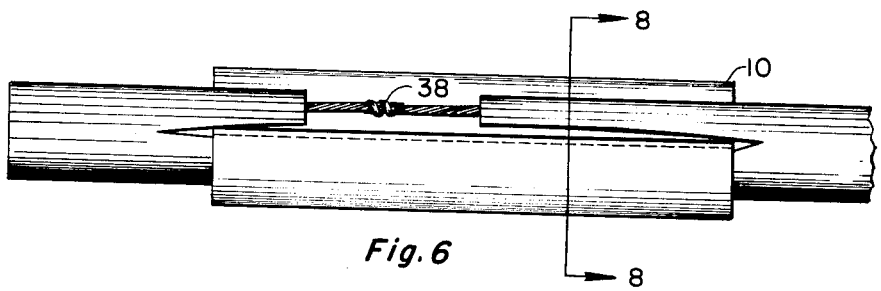
Figure 7:
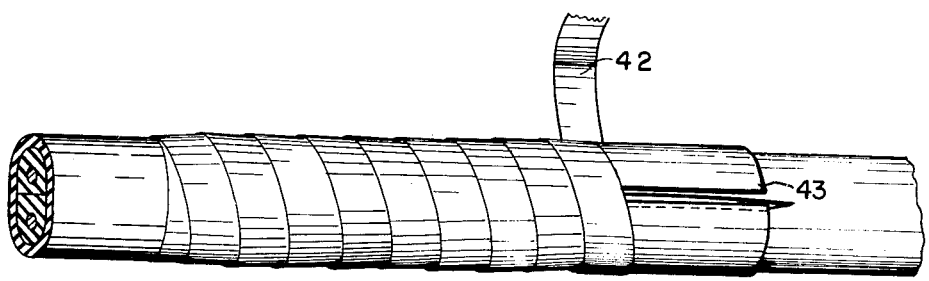
Figure 8:
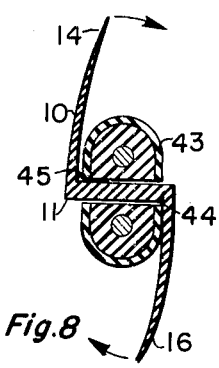

In the drawing:
FIGURE 1 is a perspective view of a splice insulator of our invention.
FIGURE 2 is a sectional view of another embodiment of our invention splice insulator.
FIGURE 3 is a sectional view of still another embodiment of our splice insulator.
FIGURE 4 is a sectional view of still another embodiment of our splice insulator.
FIGURE 5 is a lengthwise view of a cable splice prepared in accordance with our invention.
FIGURE 6 is a lengthwise view of the next step of the splice of FIGURE 5.
FIGURE 7 is a lengthwise view of a partially-wrapped joint made to our invention.
FIGURE 8 shows a section through the lines 8—8 of FIGURE 6.

The splice insulator indicated by the numeral 10 in its entirety in FIGURE 1 is made of a flexible insulating material of which molded neoprene is a preferred example. The insulator 10 has a strip 11 of uniform thickness great enough to provide dielectric strength sufficient to insulate the cable conductors from each other with a generous factor of safety. The strip 11 has edges 12 and 13 from which there extend the respective webs 14 and 16 in opposite directions transversely to the strip 11. The webs 14 and 16 are considerably less thick than the strip 11 so that they will have adequate flexibility and are longer than the web 11 for reasons that will be explained hereinafter. As shown in the drawing the length $L_2$ of the web 14 equals the length $L_3$ of the web 16 and both are greater than the length $L_1$ of the strip 11.

A mining machine cable usually has the flat configuration shown best in FIGURE 5 where a cable is indicated generally by the numeral 17. The cable 17 has two flexible stranded conductors 18, 19 and a tough overall jacket 21. The conductors 18, 19 are covered respectively by electrical insulations 22, 23 which usually are of different colors for purposes of identification. The insulations 22, 23 are D-shaped with flat surfaces 26 and 27 facing each other. In the cable arts generally, it is customary to strip the jacket from the insulation of power cables when a splice is made but, so great is the need for speed in repairing mining machine cables, that it is necessary to save the time it takes to strip away the cable jacket and we have invented means and method of making a cable joint where jacket stripping is not necessary. As shown in FIGURE 5 the cable 17 has been cut in two lengths 28 and 29 in the course of repairing a fault. It will, of course, be understood that instead of repairing a single cable divided into two lengths all the features of our invention are equally applicable where two different cables have to be spliced together. This may be found necessary on an emergency basis where the existing cable is found to be too short for the mining machine to advance to a new location and an additional length of cable must be grafted onto it. In that case the lengths 28 and 29 will represent different cables instead of different lengths of the same cable. We prefer to cut the two conductors in staggered form so that the conductor 19 terminates at a point 31 beyond a terminating point 32 of the conductor 18 of the length 28. We similarly stagger the ends of the conductors of the length 29 so that the resulting splices occur at different points of the finished joint. It should be borne in mind, however, that even this staggering consumes some time and our jointing method is also applicable where the ends 31 and 32 are not staggered. The conductor 18 is exposed by cutting the jacket 21 and the insulation 18 flush at a section 33 and similar exposures of the other conductors have been made by means of cuts 34, 35, 36 and the conductors have been spliced together by means of compression clamps 37, 38. It will be understood that other means of connecting conductors such as compression sleeves and welding can also be used within the scope of our invention.

A slit 39 is made between the conductors of the length 28 and a similar slit 41 in the length 29 so that the total length open between the conductors is only slightly in excess of the width W (FIGURE 1) of the insulator 10. The insulator 10 is inserted between the splices made by the clamps 37 and 38 as shown in FIGURES 6 and 8 with the strip 11 insulating the conductors from each other. The flat surface 26 of the insulation 22 fits against the upper surface of the strip 11 and the surface 27 against the lower surface of the strip 11 while the webs 14 and 16 extend vertically.

Friction tape 42 is then wound around the joint in a helix that folds the webs 14 and 16 around the conductors with a portion of the webs extending over the jacket 21. The web 14 is long enough to fold around the cable to a point 43 on the surface of the jacket that is more than half way around. As a result, if there is any force tending to dislodge the strip 11 to the left (as seen in FIGURE 8), the web 14 will be in tension and will resist displacement of the strip 11. Similarly, after the application of the tape 42 the web 16 will be under tension and will resist any displacement of the strip 11 to the right. The webs 14 and 16 have well-defined angles 45, 44 with the strip 11 so that the webs obstruct any motion of the strip 11 that would tend to shear them against the cable. This locking action which keeps the insulator 10 firmly set in our cable joint is an important feature of our invention as may be readily understood when the rough treatment the spliced cable must undergo is considered.

FIGURE 2 shows an insulator 46 in which the strip 11 has webs 47, 48 extending transversely from its edges with the web 48 being longer than the web 47. Branching from the web 48 is a third web 49 substantially parallel to the strip 11. The insulator 46 is particularly adapted to jointing cables with a flat grounding wire 51 and the web 49 is long enough to wrap around the wire 51 when the joint is taped.

In FIGURE 3 an insulator 52 is adapted for a cable with three conductors including a central conductor 53 and two ground wires 54, 55. Here a web 56 has two webs 57, 58 projecting from it and a web 59 has a web 61 parallel to the strip 11 and webs 57, 58.

In FIGURE 4 a spacer 62 for a four-conductor cable has two webs 63, 64 of equal length projecting from its edges and the additional webs 66, 67 projecting parallel to the strip 11.

The configuration of all the insulators 46, 52, 62 is seen from the drawing to be such that the act of wrapping a tape counterclockwise will fold all the webs around their respective portions of a splice.

We have invented a new and useful splice insulator and cable joint and a novel method for making the same for which we desire an award of Letters Patent.

We claim:

1. A flexible cable-splice insulator comprising a strip of electrically insulating material and two transverse insulating webs extending in opposite directions from the opposing edges of said strip, said webs being substantially less thick than said strip and forming well-defined dihedral angles therewith.

2. A flexible cable-splice insulator comprising a strip of electrically insulating material and two transverse insulating webs extending in opposite directions from the opposing edges of said strip, said webs being substantially less thick than said strip, and said webs each having a length greater than the length of said strip and forming well-defined dihedral angles therewith.

3. A flexible cable-splice insulator for a two-conductor cable comprising a strip of electrically insulating material of uniform thickness and two transverse insulating webs extending in opposite directions from the opposing edges of said strip said webs being substantially less thick than said strip and tapering in section away from said strip, said webs each having a length greater than the length of said strip and sufficient to wrap more than half way around said conductors and said webs forming well-defined dihedral angles with said strip.

4. A flexible cable-splice insulator comprising a strip of electrically insulating material of uniform thickness, two transverse insulating webs extending in opposite directions from the edges of said strip, one of said webs being longer than the other of said webs, and a third insulating web branching from said longer web in the direction of and parallel to said strip.

5. A flexible cable-splice insulator comprising a strip of electrically insulating material of uniform thickness, two transverse insulating webs extending in opposite directions from the edges of said strip, and third and fourth insulating webs branching in opposite directions from said webs in the direction of and parallel to said strip.

6. A flexible cable joint in a cable having a plurality of conductors comprising a plurality of splices connecting said conductors, a strip of electrically insulating material separating two of said splices, two transverse insulating webs extending in opposite directions from the opposing edges of said strip said webs being substantially less thick than said strip, and a helical tape wrapping covering said splice and folding said webs around said conductors.

7. A flexible cable joint in a cable having a plurality of conductors, insulating walls over said conductors and an overall jacket, comprising a plurality of splices connecting said conductors, a strip of electrically insulating material separating two of said splices and extending between said insulating walls, two transverse insulating webs extending in opposite directions from the edges of said strip said webs being substantially less thick than said strip, and a helical tape wrapping covering said splices and portions of said jacket on both sides thereof said wrapping folding said webs around said splices and said jacket.

8. A flexible cable-splice insulator comprising a strip of electrically insulating material of uniform thickness, two transverse insulating webs extending in opposite directions from the edges of said strip, one of said webs being longer than the other of said webs, third and fourth insulating webs branching from said longer web in the direction of and parallel to said strip, and a fifth insulating web branching from the shorter of said transverse webs in the direction of and parallel to said strip.

References Cited by the Examiner

UNITED STATES PATENTS

| | | | |
|---|---|---|---|
| 1,165,141 | 12/15 | Sprong et al. | 174—88 |
| 1,259,117 | 3/18 | McCormick. | |
| 2,191,544 | 2/40 | Ruskin | 174—88 |
| 2,585,054 | 2/52 | Stachura | 174—95 X |
| 2,639,312 | 5/53 | Kerwin | 174—88 X |

FOREIGN PATENTS 702,405   1/54   Great Britain.

LARAMIE E. ASKIN, *Primary Examiner.*

JOHN P. WILDMAN, JOHN F. BURNS, *Examiners.*